Dec. 10, 1940. W. T. HANCOCK Re. 21,655
PROCESS FOR REFINING CRACKED PETROLEUM DISTILLATE
Original Filed Sept. 1, 1937
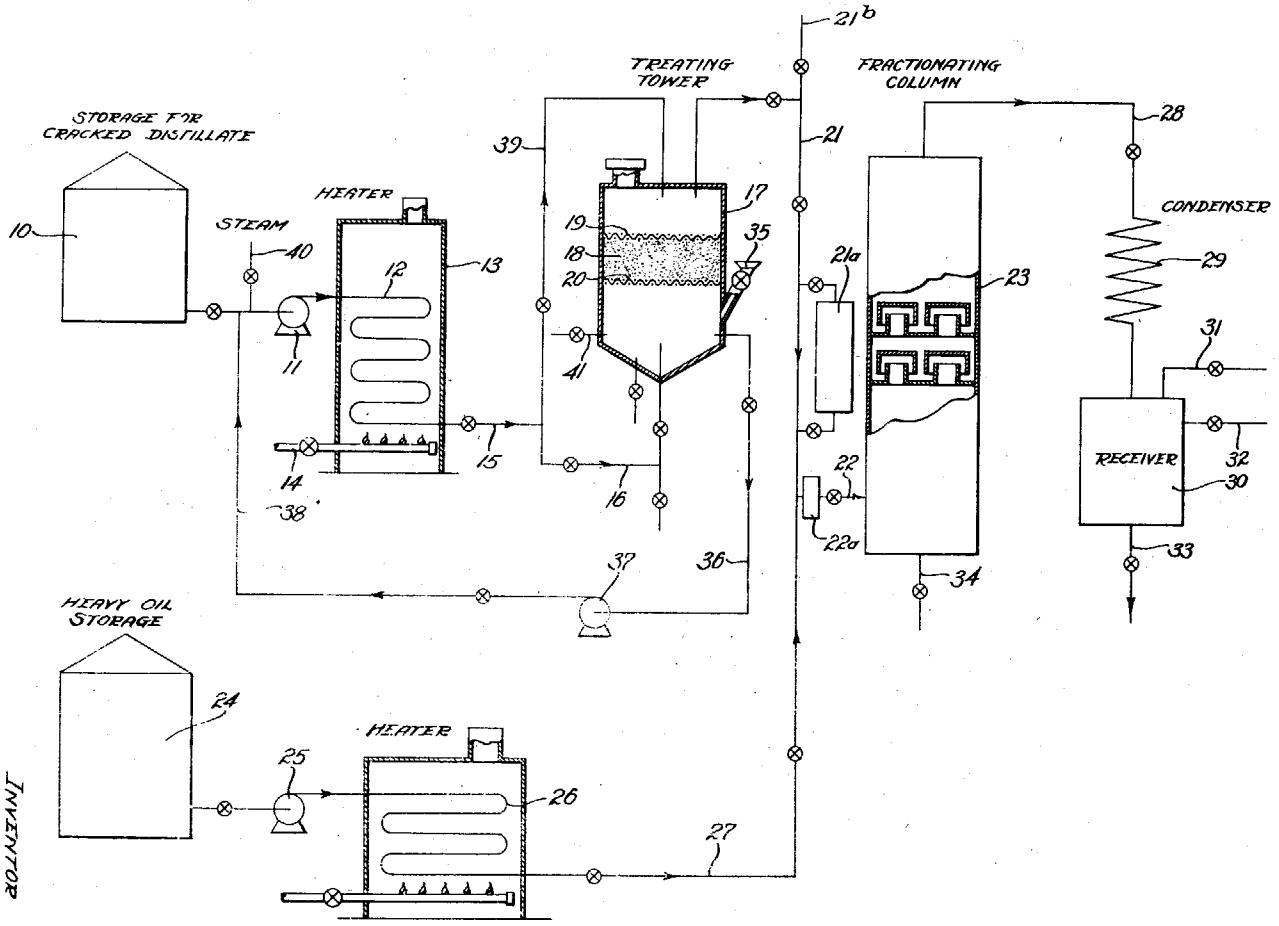
INVENTOR
WILLIAM T. HANCOCK
Charles White
ATTORNEY Reissued Dec. 10, 1940 Re. 21,655

UNITED STATES PATENT OFFICE 21,655

PROCESS FOR REFINING CRACKED PETROLEUM DISTILLATE

William Thornhill Hancock, Long Beach, Calif.

Original No. 2,162,715, dated June 20, 1939, Serial No. 161,954, September 1, 1937. Application for reissue May 27, 1940, Serial No. 337,559

10 Claims. (Cl. 196—147)

This invention relates to improvements in the treatment of hydrocarbon oils and distillates thereof, and is particularly directed to petroleum refinery practice in which the production of gasoline having enhanced color stability with decreased gum and sulphur content is of prime importance.

Heretofore, in the production of gasoline, the crude distillate has been treated with sulphuric acid which has resulted in relatively large losses of distillate due to sulphonation and polymerization of desired hydrocarbons.

This is especially true with respect to the treatment of cracked gasoline distillate, to which this invention is primarily directed, and it has been determined that contact materials, such as clays, fuller's earth and the like, have heretofore been of little importance for the purification of cracked gasoline derived from California's petroleum either in liquid or vapor phase. This is believed to be largely due to the constitution of California petroleum which differs largely in chemical constitution from petroleum of Pennsylvania and Mid-Continent stocks.

It is therefore an object of this invention to provide a process for treating cracked pressure distillates, especially cracked gasoline, under polymerizing conditions preferably with contact materials and with a selection solvent for certain impurities so that an improved specification gasoline having reduced sulphur and gum content will result combined with an increase in volume under certain conditions.

As illustrative of this end, a liquid cracked gasoline is so treated with clay, fuller's earth, or other equivalent material, that polymerization of certain gum-forming constituents occurs. Polymerization of certain organic sulphur derivatives likewise occurs and the elimination of such polymers of higher boiling range than the desired gasoline has heretofore been incomplete by the usual methods of fractional redistillation.

This invention provides that the cracked distillate, of gasoline boiling range or containing fractions of gasoline boiling range, is treated to effect polymerization of certain undesired constituents thereof, whereby a change in condition of undesired impurities occurs to give products removable by fractionation, and such treatment is combined with the selective solvent action of a hydrocarbon oil of higher boiling range than the finally desired cracked gasoline to remove such polymerized undesired material.

The polymerization of undesired constituents of the oil may be effected in any of many well known ways, such as by heat and pressure, catalysis, contact with adsorptive materials, either in liquid or vapor phase, but is specifically illustrated herein by describing a treatment with contact materials in liquid phase, for convenience only, and it should be distinctly understood that the invention is not limited to a combination including such specific step.

Referring to the diagrammatic sheet of drawings, a pressure distillate such as a cracked gasoline may be withdrawn from storage 10 by pump 11 and passed through a coil 12 in heater 13 and brought therein to a temperature of from 200° or 300° F. to 500° F. by burner 14, or to a temperature sufficiently high to effect vaporization of desired fractions at a selected point in a succeeding step of the process but below the cracking point of the distillate.

From coil 12 the heated distillate is passed through pipe 15 and pipe 16 into the lower part of a treating tower 17 in which a body of porous adsorptive contact material 18 is held between upper and lower perforated screens 19 and 20, respectively, in well known fashion to permit ready flow of the distillate therethrough.

Material 18 may be any one, or a mixture, of any of the well known polymerizing, decolorizing, filtering, and adsorptive clays, such as fuller's earth, bentonite, Death Valley clay, Muroc clay, or the like, and which may or may not have inherent or formed catalytic properties conducive to the results of this invention.

The heated cracked distillate flows upwardly through the adsorptive material 18 at such a rate and such velocity as to permit polymerization, or other change of state, of undesired constituents of the distillate such as polymerization of the diolefines, sulphur compounds and the like, which are carried along with the liquid oil to pass out of tower 17 through pipes 21 and 22 when the mixture is expanded into a fractionating column 23.

Simultaneously and concurrently, there is passed with the thus treated cracked distillate into fractionating column 23 a stream of a heavier oil adapted to exercise a solvent effect on the undesired polymerized compounds, said heavier oil being of a higher boiling range than the finally desired distillate.

Within such higher boiling range, said heavier oil may be a crude oil containing gasoline fractions, a topped or stripped crude oil containing no gasoline fractions, or a fuel oil or gas oil free of gasoline fractions which is withdrawn from storage 24 by pump 25, heated in coil 26 and passed through pipe 27 to join the heated cracked and treated distillate in pipe 22.

Merely as illustrative, if the cracked distillate coming from tower 17 is at a temperature of about 350° F., the heavier oil heated to a temperature of about 525° F. is mixed with the heated cracked distillate in pipe 22 to enter the column as a stream at a temperature of about 500° F. sufficient to flash all fractions desired in the final product but insufficient to produce cracking of the mixed streams.

Turbulent flow through pipe 22 may be sufficient to provide ample mixing of the streams to secure the proper solvent action of the heavier oil on the undesired compounds to be removed, but any well known mixing device 22a may be inserted in pipe 22 to assure such action.

The mixture is fractionated in column 23 to provide a desired cut, such as specification boiling range gasoline, which passes out through line 28 to be condensed in condenser 29 and collected in receiver 30 whence gases may be withdrawn through pipe 31, gasoline through pipe 32 and any water through pipe 33.

The bottoms from column 34, comprising the heavy oil containing dissolved polymers and other heavy impurities of higher boiling range than gasoline, are withdrawn through pipe 34.

The rate of supply of heavy oil to the cracked distillate is not invariable for the desired effect. If a crude oil containing gasoline fractions is used, four volumes of such crude to one volume of treated cracked distillate are ample to assure the desired removal of impurities. The same range is effective when a topped crude or a gas oil is used, but such ratios are merely illustrative and can be varied within wide limits provided the temperature of the solvent oil is not higher with a given volume than the cracking point of the oil and not lower than sufficient to assure complete vaporization of desired fractions in column 23.

If crude oil containing gasoline fractions is used as the solvent oil, a double effect is obtained.

First, there is an increased yield of desired gasoline fractions of about 3% over that ordinarily obtainable if the crude oil had been run separately and the gasoline obtained therefrom added to the treated cracked distillate. This is attributed largely to the mode of operation in the novel distilling method herein disclosed, because certain gasoline fractions may now be removed from the crude oil which ordinarily cannot be recovered according to straight run distillation specifications and which materially increase the aggregate gasoline recovery while maintaining the low gum and sulphur content required thereof.

Second, the crude oil comprising heavier fractions than the desired gasoline exercises an effect, when used in the described manner, upon the polymerized compounds of the treated cracked distillate for their removal which is greatly in excess of that known by ordinary fractionating effects for the removal of heavy polymers.

This appears to be of the character of selective solvent action of the crude oil upon organic sulphur derivatives and other polymerized compounds heavier than the desired gasoline fractions and is noticeable no matter whether a crude oil containing gasoline fractions, or a topped crude, or fuel oil, or gas oil, is used.

As illustrative of this second effect, when using a fuel oil containing no gasoline fractions, the same being a residuum from the distillation of straight run gasoline, in the ratio of about four volumes of the heavier oil to one volume of treated cracked distillate at about the temperatures indicated, the gums were reduced from 150 milligrams per 100 cc. to 6 milligrams per 100 cc., the former being that obtained by cracked distillate treated with adsorptive material in the manner disclosed and fractionated but without the solvent effect of the introduced topped crude oil.

Likewise, the sulphur in the gasoline from such treatment is reduced from 0.60 to 0.25%.

Obviously, there is a material change in quality which is not due to, and cannot be obtained by, simple fractionation of clay-treated cracked distillates.

The result is obtainable by the disclosed steps provided heavier fractions of solvent oil are used in sufficient quantity to obtain the desired percentage removal of impurities whether gasoline fractions are combined with the heavier oil or not. The combined treatment provides a material reduction in losses over that of the conventional treatment of cracked gasoline with sulphuric acid, and at the same time gives greatly reduced gum and sulphur content over stocks either acid or clay treated in conventional ways.

The entire operation may take place under super-atmospheric pressure, but preferably the cracked distillate and heavy solvent oil are heated under a pressure between 50 and 200 pounds per square inch sufficient to prevent substantial vaporization of the oils. This is applicable to the cracked distillate during clay treatment and the combined stream may then be introduced into column 23 under a reduced pressure sufficient to permit vaporization of desired fractions which are then condensed under any desired pressure, superatmospheric or otherwise.

Valves are provided throughout the system to accomplish the above-described operating conditions.

If the contact material 18 becomes clogged, the flow of cracked distillate may be temporarily reversed through pipe 39 to clear the same by the use of suitable pipes and valves provided therefor.

Steam may be introduced through pipes 40 and 41, if so desired.

Additional clay contacting means are provided in the introduction of finely ground contact material in a well known manner through port 35 into the lower part of tower 17 where it is maintained in suspension by the introduced oil, or steam, and recirculated with a portion of the cracked distillate through pipe 36, pump 37, and pipe 38 back to suction side of pump 11 to pass through the heating coil 12.

In this event, the oil is given extended contact with the clay and the bed of clay 18 not only acts on the oil as described, but also serves to restrain the passage of disseminated clay particles.

It should be understood that the invention is not limited to the specific steps disclosed. For instance, in addition to heating of the cracked distillate and the stream of solvent oil to a temperature sufficient to effect fractional distillation of the mixture without added heat, the invention comprehends broadly the distillation of a cracked distillate containing polymerized bodies in the presence of a solvent oil of higher boiling range than the desired final product, whether this be a gasoline or other cut, and conducting such distillation with or without added heat. That is to say, all the heat required for distillation may be contained in the oils when mixed, or additional heat may be supplied after mixing.

Obviously, the clay-treated cracked distillate may be cooled and redistilled in the presence of the added solvent oil of about equal volume at least, but with present efficient refinery layouts, it would be uneconomical to first cool and then reheat the streams of oils because the heated residuum of straight run crude distillation is readily available as a solvent oil.

As before stated, the process is effective upon polymerized compounds in the oil which are to be removed by the solvent oil and is applicable to all distillates containing polymerized products produced in any manner. For instance, if the cracked distillate is passed through the adsorptive contact material 18 in vapor phase in a well known manner certain compounds will be polymerized and be drained off in the contact material while others will be carried along as vapors to be thoroughly mixed with the solvent oil and injected into the fractionating column. Alternatively, the treated vapors may be partially, or wholly, condensed in condenser 21*a* before mixing with the solvent oil.

Alternatively, a distillate containing undesired polymerized bodies in liquid or vapor phase may be introduced into pipe 21 through pipe 21*b* from any source of supply to be treated as described with a solvent oil, either as an individual stream or partly mixed with treated liquid or vapor from tower 17.

This application is a continuation-in-part of my co-pending application Serial No. 82,394, filed May 29, 1936.

I claim as my invention:

1. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating an independent heavier oil having a substantially higher boiling range than said gasoline fraction, mixing said distillate after passage through said adsorptive material and while heated, with a substantially large quantity of the heated heavier oil under pressure sufficient to maintain the major portion of said gasoline constitutents of said distillate in liquid phase during the mixing, then reducing the pressure of the mixed oils and vaporizing said gasoline fraction from the heavier oil by virtue of the pressure reduction and heat contained in the mixed oils, leaving polymerized and sulphur containing constituents of the distillate in the unvaporized oil, and condensing the vaporized gasoline fraction.

2. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating an independent heavier oil having a substantially higher boiling range than said gasoline fraction, mixing said distillate after passage through said adsorptive material and while heated, with a substantially large quantity of the heated heavier oil under pressure sufficient to maintain the major portion of said gasoline constituents of said distillate in liquid phase during the mixing, then further heating and reducing the pressure of the mixed oils and vaporizing said gasoline fraction from the heavier oil by virtue of the pressure reduction and heat contained in the mixed oils, leaving polymerized and sulphur containing constituents of the distillate in the unvaporized oil, and condensing the vaporized gasoline fraction.

3. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating an independent heavier oil having a substantially higher boiling range than said gasoline fraction to a temperature higher than the temperature of the distillate, mixing said distillate after passage through said adsorptive material and while heated, with a substantially large quantity of the heated heavier oil under pressure sufficient to maintain the major portion of said gasoline constituents of said distillate in liquid phase during the mixing, then reducing the pressure of the mixed oils and vaporizing said gasoline fraction from the heavier oil by virtue of the pressure reduction and the heat contained in the mixed oils, leaving polymerized and sulphur containing constituents of the distillate in the unvaporized oil, and condensing the vaporized gasoline fraction.

4. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating an independent heavier oil having a substantially higher boiling range than said gasoline fraction to a temperature higher than the temperature of the distillate, mixing said distillate after passage through said adsorptive material and while heated, with a substantially greater quantity of the heated heavier oil under pressure sufficient to maintain the major portion of said gasoline constituents of said distillate in liquid phase during the mixing, then reducing the pressure of the mixed oils and vaporizing said gasoline fraction from the heavier oil by virtue of the pressure reduction and the heat contained in the mixed oils, leaving polymerized and sulphur containing constituents of the distillate in the unvaporized oil, and condensing the vaporized gasoline fraction.

5. The process for refining cracked petroleum distillate that includes, subjecting heated cracked distillate containing a gasoline fraction to polymerization by passing the distillate at a temperature of at least about 300° F. but below the temperature of cracking, through a body of adsorptive material, heating an independent heavier oil having a substantially higher boiling range than said gasoline fraction to a temperature higher than the temperature of the distillate, mixing said distillate after passing through said adsorptive material and while heated, with a substantially large quantity of the heated heavier oil under pressure sufficient to maintain the major portion of said gasoline constituents of said distillate in liquid phase during the mixing, then reducing the pressure of the mixed oils and vaporizing said gasoline fraction from the heavier oil by virtue of the pressure reduction and the heat contained in the mixed oils, leaving polymerized and sulphur containing constituents of the distillate in the unvaporized oil, and condensing the vaporized gasoline fraction.

6. The process for refining cracked petroleum distillate that includes, subjecting heated cracked distillate containing a gasoline fraction to polymerization by passing the distillate at a temperature of at least about 300° F. but below the temperature of cracking, through a body of adsorptive material, heating an independent heavier oil having a substantially higher boiling range than said gasoline fraction to a temperature higher than the temperature of the distillate, mixing said distillate after passing through said adsorptive material and while heated, with a substantially greater quantity of the heated heavier oil under pressure sufficient to maintain the major portion of said gasoline constituents of said distillate in liquid phase during the mixing, then reducing the pressure of the mixed oils and vaporizing said gasoline fraction from the heavier oil by virtue of the pressure reduction and the heat contained in the mixed oils, leaving polymerized and sulphur containing constituents of the distillate in the unvaporized oil, and condensing the vaporized gasoline fraction.

7. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating crude oil containing gasoline fractions and heavier fractions having a boiling range substantially higher than gasoline to a temperature higher than the temperature of the distillate, mixing said distillate after passage through said adsorptive material and while heated, with a substantially large quantity of the heated crude oil under pressure sufficient to maintain the major portion of said gasoline constituents of said distillate in liquid phase during the mixing, then reducing the pressure of the mixed oils and vaporizing said gasoline fraction from the heavier oil by virtue of the pressure reduction and the heat contained in the mixed oils, leaving polymerized and sulphur containing constituents of the distillate in the unvaporized oil, and condensing the vaporized gasoline fraction.

8. The process for refining cracked petroleum distillate that includes, subjecting heated cracked distillate containing a gasoline fraction to polymerization by passing the distillate at a temperature of between about 200° and 500° F. but below the temperature of cracking, through a body of adsorptive material, heating an independent heavier oil having a substantially higher boiling range than said gasoline fraction to a temperature higher than the temperature of the distillate, mixing said distillate after passage through said adsorptive material and while heated, with a substantially large quantity of the heated heavier oil under pressure sufficient to maintain the major portion of said gasoline constituents of said distillate in liquid phase during the mixing, then reducing the pressure of the mixed oils and vaporizing said gasoline fraction from the heavier oil by virtue of the pressure reduction and the heat contained in the mixed oils, leaving polymerized and sulphur containing constituents of the distillate in the unvaporized oil, and condensing the vaporized gasoline fraction.

9. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating an independent heavier oil having a substantially higher boiling range than said gasoline fraction, mixing said distillate after passage through said adsorptive material and while heated, with a substantially large quantity of the heated heavier oil under conditions in which the distillate is at least partially in vapor phase during the mixing, then vaporizing said gasoline fraction from the heavier oil leaving polymerized and sulphur containing constituents of the distillate in the unvaporized oil, and condensing the vaporized gasoline fraction.

10. The process for refining cracked petroleum distillate that includes, subjecting heated cracked distillate containing a gasoline fraction to polymerization by passing the distillate at a temperature of at least about 200° F. but below the temperature of cracking, through a body of adsorptive material, heating an independent heavier oil having a substantially higher boiling range than said gasoline fraction, mixing said distillate after passage through said adsorptive material and while heated, with a substantially large quantity of the heated heavier oil heated to a temperature higher than the temperature of the distillate being mixed therewith and under conditions in which the distillate is at least partially in vapor phase during the mixing, then vaporizing said gasoline fraction from the heavier oil leaving polymerized and sulphur containing constituents of the distillate in the unvaporized oil, and condensing the vaporized gasoline fraction.

WILLIAM THORNHILL HANCOCK.